Figure 1:
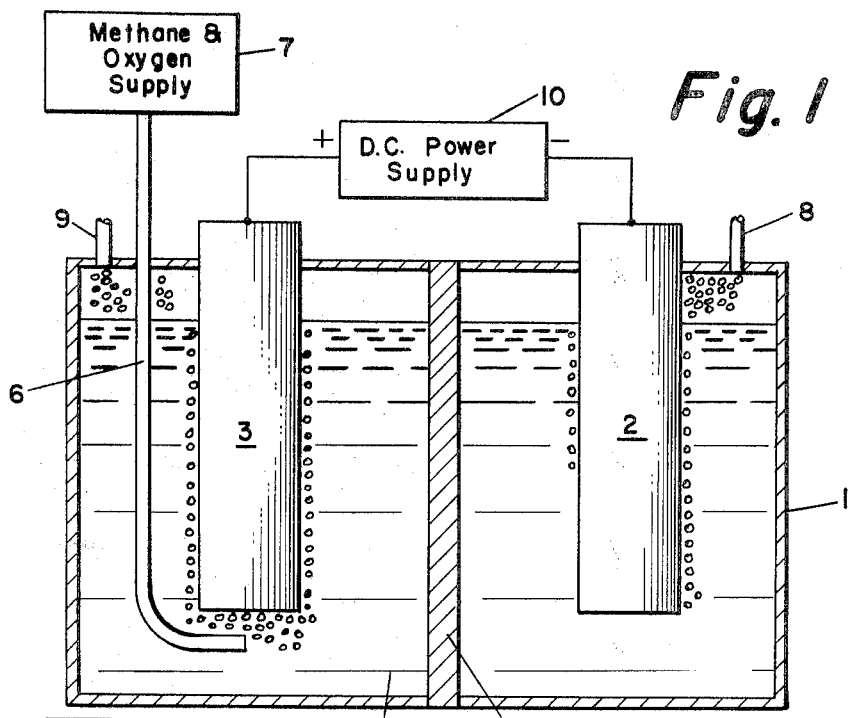

Feb. 22, 1966  J. B. BRAVO ETAL  3,236,754
ELECTROLYTIC PREPARATION OF METHYL CHLORIDE
Filed Nov. 14, 1962  2 Sheets-Sheet 1

INVENTORS
JUSTO B. BRAVO
RAYMOND WYNKOOP
BY George L. Church
ATTORNEY

INVENTORS
JUSTO B. BRAVO
RAYMOND WYNKOOP
ATTORNEY 3,236,754
ELECTROLYTIC PREPARATION OF METHYL
CHLORIDE
Justo B. Bravo, Malvern, and Raymond Wynkoop, Gladwyne, Pa., assignors to Sun Oil Company, Philadelphia, Pa., a corporation of New Jersey
Filed Nov. 14, 1962, Ser. No. 237,657
4 Claims. (Cl. 204—81)

This invention relates to the preparation of methyl chloride by the electrolysis of aqueous sodium chloride in the presence of methane gas and oxygen gas and in an electrolytic cell which contains a catalytic anode. The invention embraces the method of preparation and, in a preferred embodiment, the electrolytic cell itself.

Methyl chloride has a variety of commercial uses. By way of example, it is used as a methylating agent in organic syntheses, particularly in the pharmaceutical industry, as a refrigerant, and as a local anesthetic. Several methods of preparing methyl chloride are known. Methane reacts readily with chlorine to produce methyl chloride ($CH_3Cl$), but the yields are low since the reaction also produces substantial amounts of methylene chloride ($CH_2Cl_2$), chloroform ($CHCl_3$), and carbon tetrachloride ($CCl_4$). The chief commercial preparation of methyl chloride at the present time involves reacting methanol with phosphorous pentachloride or sulfuryl chloride. The reaction products are methyl chloride, hydrogen chloride, and either phosphorous oxychloride or sulfur dioxide. The methanol starting material is, however, a relatively expensive chemical. Since methane is available in extremely large quantities at low cost from natural gas, a method of producing methyl chloride from methane without the formation of by-products is desirable.

It has now been found that methyl chloride can be prepared by an electrolytic process which comprises (1) electrolyzing an aqueous sodium chloride (NaCl) solution in an electrolytic cell which contains a catalytic anode and (2) passing methane gas and oxygen gas into the aqueous electrolyte during the electrolysis. In the operation of the cell the sodium ions in the aqueous electrolyte are attracted to the cathode where they combine with water from the aqueous electrolyte to form sodium hydroxide (NaOH) and hydrogen gas. This half-cell reaction can be indicated as follows (e=electron):

(Equation 1)
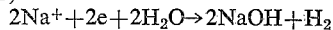
$$2Na^+ + 2e + 2H_2O \rightarrow 2NaOH + H_2$$

At the anode the methane gas forms, in the presence of the catalytic metal in the anode, free $CH_3$ radicals which then combine with the chlorine ions attracted to the anode and with oxygen gas to form methyl chloride and water. This half-cell reaction can be indicated as follows:

(Equation 2)
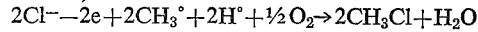
$$2Cl^- - 2e + 2CH_3^\circ + 2H^\circ + \tfrac{1}{2}O_2 \rightarrow 2CH_3Cl + H_2O$$

The over-all cell reaction can be indicated as follows:

(Equation 3)
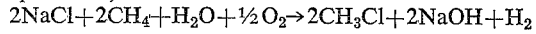
$$2NaCl + 2CH_4 + H_2O + \tfrac{1}{2}O_2 \rightarrow 2CH_3Cl + 2NaOH + H_2$$

The methyl chloride produced according to the invention is essentially free of the other chlorinated methanes mentioned hereinbefore.

Figure 2:
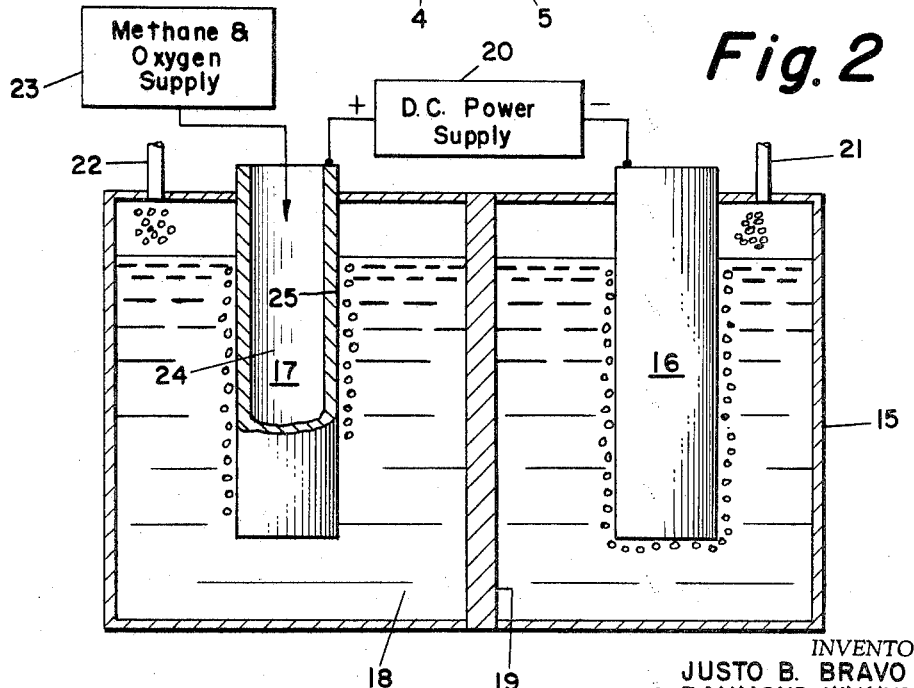
Figure 3:
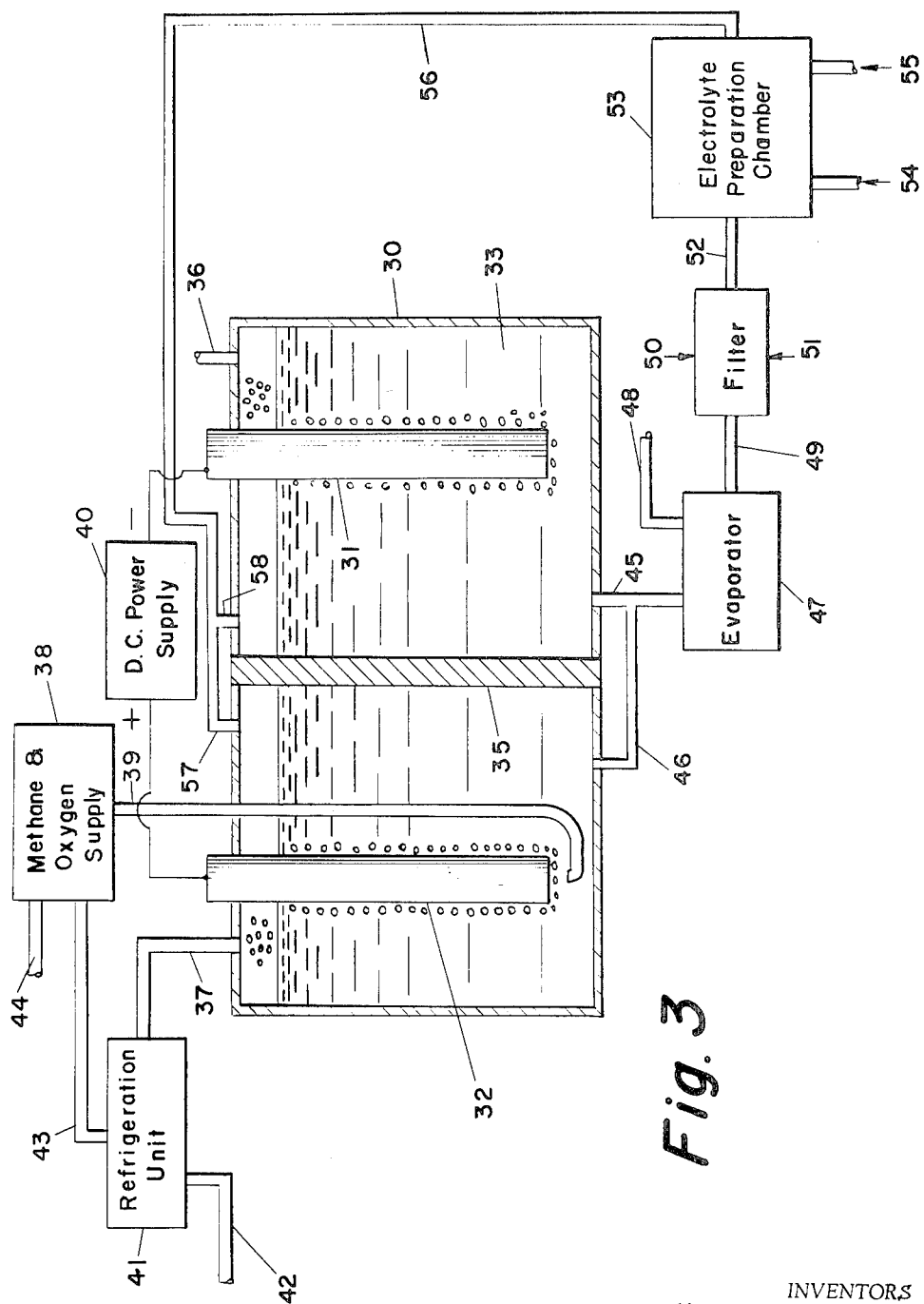

The invention is best described with reference to FIGURES 1, 2, and 3, each of which illustrates one method of preparing methyl chloride according to the invention. FIGURE 1, which will be discussed first, shows an electrolytic cell especially suitable for batchwise preparation of methyl chloride. FIGURE 2 is the same as FIGURE 1 except that it illustrates the use of a preferred and novel type of catalytic anode. FIGURE 3 illustrates one method of adapting the invention to the continuous production of methyl chloride.

With reference to FIGURE 1 the electrolytic cell comprises a housing 1 which is fabricated from a material which is resistant to aqueous NaCl, aqueous NaOH, and $CH_3Cl$. Examples of suitable materials are steel, titanium alloys, ceramic, and chemically resistant rubbers or polymers such as tetrafluoroethylene ("Teflon"). The housing is adapted to receive two electrodes, a cathode 2, and a catalytic anode 3 which are immersed in the aqueous NaCl electrolyte 4 and which are preferably separated by a diaphragm 5 which is permeable to sodium and chlorine ions but which is essentially impermeable to the gases present in the cell. The housing is also adapted to receive a delivery tube 6 for passing methane gas and oxygen gas, from a source indicated at 7, into the electrolyte. The housing is additionally provided with a vent 8 for removal of hydrogen and a vent 9 for removal of methyl chloride and any unreacted methane gas and oxygen gas.

The cathode 2 can be constructed of steel, a standard electrode grade of carbon, brass, bronze, or of comparable materials such as ceramic or sodium-hydroxide-resistant glass made conductive by the addition of a suitable conductive material such as marbon. Steel or carbon are preferred. The shape of the cathode is not critical and can be, for example, cylindrical, elliptical, or rectangular.

The catalytic anode 3 contains, as an essential feature, a metal which catalyzes the half-cell reaction described hereinbefore whereby methane gas forms a free $CH_3$ radical. Metals which have been found suitable for this purpose are nickel, gold, platinum, and palladium. The catalytic anode can be fabricated entirely from such a catalytic metal or, alternatively, one or more of these catalytic metals can be deposited on a metallic or nonmetallic, conductive or nonconductive matrix such as carbon, steel, ceramic, and the like. However, the use of metallic matrices such as steel is less desirable because they are susceptible to attack by the chlorine ions present at the anode. Similarly the use of nonconductive matrices such as ceramic is also less desirable because they usually require, in order to make the electrode conductive, an amount of catalytic metal in excess of that required for catalytic action. A carbon matrix, on the other hand, does not raise either of these objections for it is conductive and it is highly resistant to chlorine. Good results have been obtained using as an anode a carbon rod containing 1 to 30 percent by weight of platinum deposited thereon. If desired, the carbon matrix can be porous carbon and when the latter is used it will desirably have the physical properties described hereinafter.

The shape of the catalytic anode is not critical to the operability of the invention and can be, for example, cylindrical, elliptical, or rectangular.

A preferred type of catalytic anode from a standpoint of cell efficiency is more fully described hereinafter in conjunction with FIGURE 2.

Methane gas and oxygen gas, the latter as either oxygen per se, air, or the like, is obtained from a source indicated at 7 and passed into the aqueous NaCl electrolyte through delivery tube 6. Alternatively, separate delivery tubes can be used for each gas. The reaction between the chlorine ions, methane, and oxygen to form methyl chloride and water occurs at the surface of the anode in the presence of the catalytic metal contained thereon. It is essential, therefore, that the methane gas and oxygen gas be present at the anode surface. This is conveniently accomplished by positioning the delivery tube 6 so that its outlet is at the bottom of the catalytic anode. The bubbles of gas escaping from the delivery tube float upward along the anode surface. It is, however, not essential that the end of the delivery tube be positioned in the manner just described. Within the limitation mentioned below, the delivery tube discharge can also be positioned elsewhere in the cell for generally the mere bubbling of methane gas and oxygen gas into the electrolyte creates sufficient agitation to carry some of the methane and oxygen to the anode surface. If desired, mild agitation of the electrolyte can be employed to insure the presence of methane gas and oxygen gas at the anode surface. It will be recognized that the amount of unreacted methane gas and oxygen gas which escapes from the surface of the electrolyte and passes out of the cell through vent 9 will be reduced by positioning the end of the delivery tube near the catalytic anode, as shown in FIGURE 1. It will also be recognized that when a diaphragm indicated at 5 is employed, the end of the delivery tube 6 should be positioned on the anode side of the diaphragm.

The amount of methane gas and oxygen gas passed into the electrolyte will depend chiefly upon the amount of chlorine ions that are attracted to the anode. The latter will in turn depend upon the potential applied across the electrodes, the strength of the electrolyte, the presence of a porous diaphragm, and the like. It can be seen from an examination of Equation 2 hereinbefore that one mol of chlorine reacts with two mols of methane and one-half mol of oxygen to produce two mols of methyl chloride. In the operation of the cell, it is desirable to maintain an excess of methane and oxygen at the anode surface for if insufficient methane and oxygen are present some of the chlorine ions attracted to the anode will be converted to and pass out of the cell as chlorine gas rather than methyl chloride.

The porous diaphragm indicated at 5 is interposed between the anode and the cathode and, in effect, separates the cell into an anode compartment and a cathode compartment. The purpose of the diaphragm is to prevent, for example, any methane gas or oxygen gas at the anode from migrating to the cathode and causing any undesirable side reactions and/or contaminating the hydrogen gas produced at the cathode. Similarly, the diaphragm prevents any hydrogen from migrating to the anode. While the use of the diaphragm is not necessary to the operability of the invention, its use does reduce side reactions and product contamination and hence makes cell operation more efficient. While the diaphragm should be impermeable to gases, e.g., methane, air, oxygen, hydrogen, and methyl chloride, it must be permeable to sodium ions and chlorine ions. That is, the diaphragm must not prevent the migration of sodium ions and chlorine ions to their respective electrodes. Suitable gas-impermeable, sodium ion, chlorine ion-permeable materials which can be used for the diaphragm are porous asbestos, cermaic, carbon, silica, animal or synthetic membranes, and the like. Of these suitable diaphragm materials porous asbestos is preferred because while it is permeable to sodium and chlorine ions, it is also relatively impermeable to hydroxyl ions and this latter property imparts an additional benefit in the operation of the cell. The sodium hydroxide produced at the cathode ionizes in the water present, and the resulting hydroxyl ions tend to be attracted to the anode where they may initiate undesirable side reactions resulting in reduced cell efficiency. A porous asbestos diaphragm partially eliminates this hydroxyl ion migration and thus effects improved cell efficiency.

The electrolyte 4 is aqueous NaCl. The strength of the aqueous NaCl is not critical for the present purpose but will usually be maintained within about 12 to 25 weight percent NaCl. Below 12 percent the efficiency of the cell tends to become somewhat low with respect to power requirements.

The temperature of the electrolyte can vary considerably. While satisfactory cell efficiencies are obtained at temperatures in the range of 0° to 50° C., enhanced efficiencies are obtained at higher temperatures of, say, 50° to 90° C.

Although the cell can be operated at atmospheric pressure, it is desirable in some cases to operate the cell under a pressure of 1 to 5 atmospheres in order to reduce the escape of methane and oxygen gas from the electrolyte. Elevated pressures are especially desirable where elevated temperatures are used. When pressures greater than one atmosphere are used, the methyl chloride must obviously still be bled out of the cell. The advantage, however, is that the ratio of methyl chloride to other gases is higher at higher pressures.

A direct current voltage is applied across the electrodes from a power supply indicated at 10. The voltage required will depend upon such factors as the strength of the electrolyte, the type of electrodes used, the presence of a diaphragm, and the like but will usually be in the range of 2 to 15 volts.

Actual operation of the cell in FIGURE 1 is commenced by applying the potential across the electrodes and supplying methane gas and oxygen gas to the surface of the catalytic anode. The reaction indicated by Equation 3 hereinbefore begins to take place. Hydrogen is evolved at the cathode and is removed through vent 8. Methyl chloride is evolved at the catalytic anode and is removed through vent 9. Any excess methane gas or oxygen gas is also removed through vent 9. It will usually be desirable to separate any excess methane gas and oxygen gas from the methyl chloride gas, and this can be readily accomplished by cooling the gaseous mixture to, say, −30° C. Methyl chloride (B.P.—23.7° C.) condenses while the methane and oxygen remain gaseous.

As electrolysis continues, the concentration of NaCl in the aqueous electrolyte becomes lower and cell efficiency decreases in that the rate of methyl chloride production decreases or the amount of power required to achieve constant methyl chloride production increases. When the NaCl concentration becomes too low for economical cell operation, the electrolyte can be removed and replaced with fresh electrolyte. Normally this will be done when the NaCl concentration of the electrolyte has dropped to about 12 percent. The recovery of NaOH and NaCl from the spent electrolyte is discussed hereinafter in conjunction with FIGURE 3.

FIGURE 2 is essentially the same as FIGURE 1 except that it illustrates the use of a preferred and novel catalytic anode. The housing 15 contains a cathode 16 and a catalytic anode 17 which are immersed in a body of electrolyte 18 and which are preferably separated by a porous diaphragm 19. A direct current potential is applied across the electrodes by means of power supply 20. Hydrogen is removed through vent 21 while methyl chloride and any excess methane gas or oxygen gas are removed through vent 22.

The preferred catalytic anode 17 has several essential features. It contains a catalytic metal which as described hereinbefore can be nickel, gold, platinum, or palladium. The preferred catalytic anode is also porous to methane gas and oxygen gas. In addtion, methane gas and oxygen gas are supplied, from a source indicated at 23, to a surface 24 of the anode out of contact with the electrolyte for diffusion through the anode to a surface 25 of the anode which is in contact with the electrolyte. The methane gas and oxygen gas which diffuse through the anode combine with the chlorine ions in the aqueous electrolyte to form methyl chloride and water according to Equation 2 hereinbefore. Thus it is apparent that the major difference between the cell of FIGURE 1 and the cell of FIGURE 2 is the manner in which the methane gas and oxygen gas are supplied to the surface of the catalytic anode. The use of the preferred catalytic anode of FIGURE 2 results in improved cell efficiency, cell efficiency being the amount of methyl chloride produced per unit of power consumed.

The preferred catalytic anode can be fabricated from a variety of materials so long as it is porous to methane gas and oxygen gas and so long as it contains a catalytic metal. Since the catalytic metals mentioned above can be fabricated porous to oxygen gas and methane gas by known techniques, the catalytic anode can be constructed entirely from such a metal. Alternatively, one or more of these catalytic metals can be deposited on a porous matrix such as porous carbon, silica, and the like. A particularly suitable catalytic anode comprises a porous carbon matrix having 1 to 30 percent by weight of platinum deposited thereon. The porosity and other physical characteristics of the porous carbon matrix are not critical but are preferably within the following ranges:

Surface area _____ 120–200 m.²/gm.
Density _____ 0.4–0.6 gms./cc.
Pore size _____ At least 70% of the pores are 1–7 microns.

Pore volume $\left(\frac{\text{volume pores}}{\text{Total volume}} \times 100\right)$ 50–80%

The platinum can be deposited on the porous matrix by any of several methods. One such method is electroplating. Another method, known as thermal reduction, involves saturating the pores of the matrix with an aqueous solution of a salt or acid of the metal, heating to drive off the water, followed by heating in an atmosphere of hydrogen to reduce the metal compound to the metal. Another method, known as chemical reduction and suitable for depositing noble metals on the matrix, involves saturating the pores of the matrix with a solution of the noble metal and then contacting the solution with hydrazine ($N_2H_4$). The noble metal is liberated and deposited on the matrix.

The shape of the preferred catalytic anode is not critical. Good results have been obtained with anodes shaped as a hollow porous cylinder or as a hollow porous plate.

An illustrative embodiment of the invention especially suitable for continuous production of methyl chloride is illustrated in FIGURE 3. The basic elements have the same function as the batch cell shown in FIGURE 1. The housing 30 contains the cathode 31 and the catalytic anode 32 which are immersed in a body of electrolyte 33 and which are preferably separated by a porous asbestos diaphragm 35. The housing is provided with vent 36 for hydrogen removal and vent 37 for removal of methyl chloride and any excess methane gas and oxygen gas. Methane gas and oxygen gas are supplied, from source 38, to the catalytic anode surface by means of delivery tube 39 which terminates near the bottom of the anode. A potential is applied across the electrodes by means of power supply 40.

The major differences between the FIGURE 1 cell and the FIGURE 3 cell are the provisions in the FIGURE 3 cell for the recovery of NaCl from the spent electrolyte, the recovery of the NaOH electrolysis product, and the purification of the methyl chloride electrolysis product from any excess methane gas or oxygen gas.

The methyl chloride gas, containing any excess methane gas and oxygen gas, is removed through vent 37 and is directed to refrigeration unit 41 which is maintained at, say, −30° C. Methyl chloride condenses, is drained out of the bottom of the refrigeration unit through line 42, and is used for any purpose desired. Any excess methane gas and oxygen gas pass out of the refrigeration unit through line 43 and are recycled to the methane and oxygen supply indicated at 38. Make-up methane and oxygen are delivered to the methane and oxygen supply through line 44 from a source not shown.

The dilute NaCl solution containing the sodium hydroxide electrolysis product is drained out of the cell through lines 45 and 46 and is delivered to evaporator 47 where water is evaporated from the solution and removed through line 48. As the water is evaporated, NaCl crystallizes from the solution. When the solution has reached a NaOH concentration of about 50 percent, the NaCl content of the solution will be approximately 0.5 to 1 percent and this latter range represents the maximum recovery of NaOH-free salt that can be effected by simple evaporation. The slurry of salt in the NaOH solution is removed from the evaporator through line 49 and is delivered to filter 50. Filter 50 is any conventional filter for separating solids from liquids and is used to separate the solid NaCl from the NaOH solution. The NaOH solution is removed from the filter through line 51 and can be used for any desired purpose. Further reduction in the NaCl content of the NaOH solution can be effected by known methods, for example, by extraction with liquid anhydrous ammonia or by extraction with sodium sulfate. The former method produces an essentially NaCl-free NaOH solution; the latter method reduces the NaCl content to about .05 to .1 percent.

NaCl is removed from filter 50 through line 52 and is delivered to electrolyte preparation chamber 53. The purpose of the electrolyte preparation chamber is to prepare an aqueous NaCl electrolyte in the desired quantity and of the desired strength. Make-up water and salt enter the electrolyte preparation chamber through lines 54 and 55, respectively, and are mixed with the recovered salt from filter 50. The mixture, in the desired strength and quantity, is removed from the electrolyte preparation chamber through line 56 and is returned to the cell as the aqueous NaCl electrolyte through lines 57 and 58. The flow through lines 57 and 58 is proportioned so as to maintain a constant liquid level within the cell.

The following example specifically illustrates the benefits derived from the invention.

The cell utilized in this experiment was similar to the cell shown in FIGURE 1 and had the following characteristics:

Housing: Steel
Anode: Porous carbon rod, 5 mm. x 10 cm. having 3% by weight platinum deposited thereon by thermal reduction technique. Area exposed to electrolyte was 7 sq. cm. Properties of the porous carbon (before deposition of platinum) were:
    Surface area: 140 m²/gm.
    Density: 0.5 gm./cc.
    Pore size: 80% of pores were 1–5 microns
    Pore volume: 70%
Cathode: Carbon rod 5 mm. x 10 cm. Area exposed to electrolyte was 7 sq. cm.
Diaphragm: Porous asbestos
Initial electrolyte: 20% NaCl (by weight)
Length of experiment: 4 hours
Methane-oxygen: Bubbled into the electrolyte through a plastic tube which discharged just under the bottom of the anode
Temperature: 40° C.

A direct current potential of six volts was applied across the electrodes for a period of four hours. The average current was 2.1 amperes. The gas evolved at the anode was removed through a vent and passed through a condenser maintained at −90° C. and the condensate collected. Although methyl chloride boils at −24° C., the condenser temperature was maintained at −90° C. in order to condense any methylene chloride, chloroform, and carbon tetrachloride. The colorless condensate collected, weighed 1.58 gms. and analyzed essentially pure methyl chloride. Analyses for methylene chloride, chloroform, and carbon tetrachloride were negative.

When the other catalytic metals mentioned hereinbefore are used, substantially the same results are obtained. When the preferred catalytic anodes as described hereinbefore are used, i.e., when the methane gas and oxygen gas are supplied to a surface of the anode out of contact with the electrolyte for diffusion therethrough to a surface in contact with the electrolyte, substantially improved results are obtained.

We claim:

1. Process for electrolytic preparation of methyl chloride from an electrolytic cell having an anode and a cathode, said anode containing a catalytic metal selected from the group consisting of nickel, gold, platinum, and palladium, which comprises (1) supplying the cell with aqueous sodium chloride to immerse the anode and the cathode; (2) supplying oxygen gas and methane gas to a surface of the anode in contact with the electrolyte; (3) applying a direct current potential across the anode and the cathode; and (4) removing gaseous methyl chloride from the cell.

2. Process according to claim 1 wherein the electrolyte contains 12–25 percent by weight sodium chloride.

3. Process according to claim 1 wherein the potential applied is in the range of 2–15 volts.

4. Process according to claim 1 wherein said anode comprises porous carbon having 1–30 percent by weight platinum deposited thereon.

References Cited by the Examiner

UNITED STATES PATENTS 3,124,520  3/1964  Juda _____ 204—86

FOREIGN PATENTS 400,787  8/1909  France.

JOHN H. MACK, *Primary Examiner.*

HOWARD S. WILLIAMS, *Examiner.*